July 23, 1968 G. T. MEYER 3,393,501
BRUSSELS SPROUTS HARVESTER
Filed July 26, 1965 3 Sheets-Sheet 1

INVENTOR.
GERALD T. MEYER
BY *J. D. Geisler*
ATTORNEY

July 23, 1968  G. T. MEYER  3,393,501
BRUSSELS SPROUTS HARVESTER
Filed July 26, 1965  3 Sheets-Sheet 2

INVENTOR.
GERALD T. MEYER
BY *F. R. Geisler*
ATTORNEY

July 23, 1968  G. T. MEYER  3,393,501
BRUSSELS SPROUTS HARVESTER
Filed July 26, 1965  3 Sheets-Sheet 3
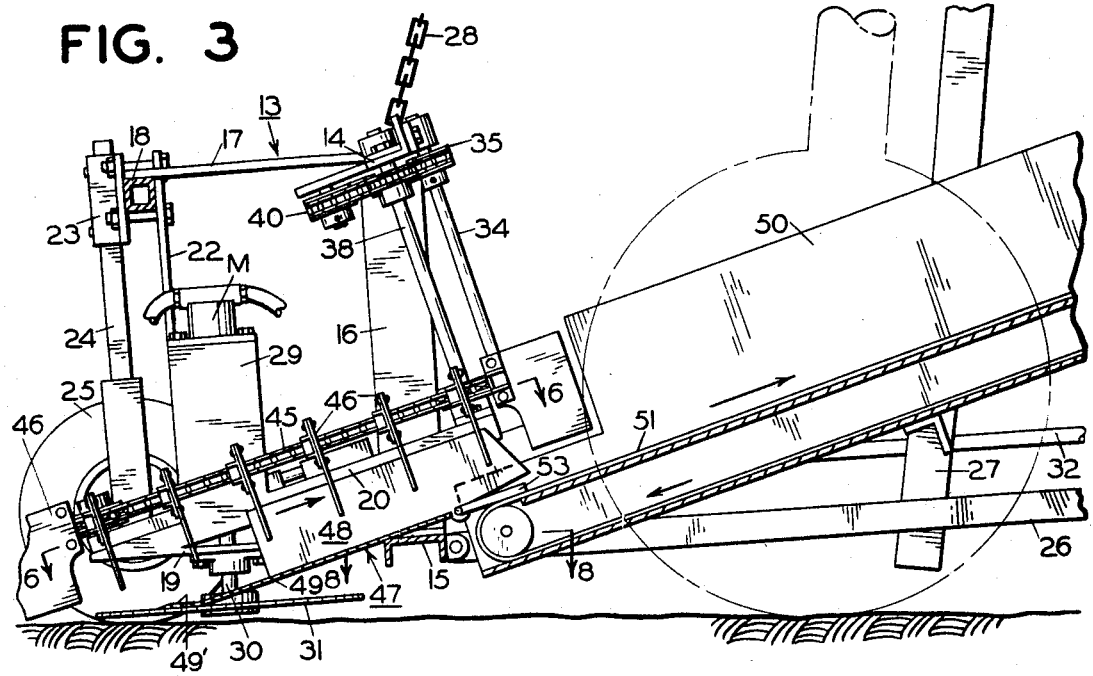
FIG. 3
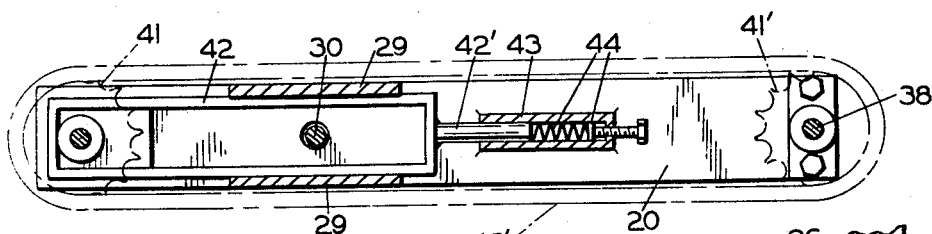
FIG. 6
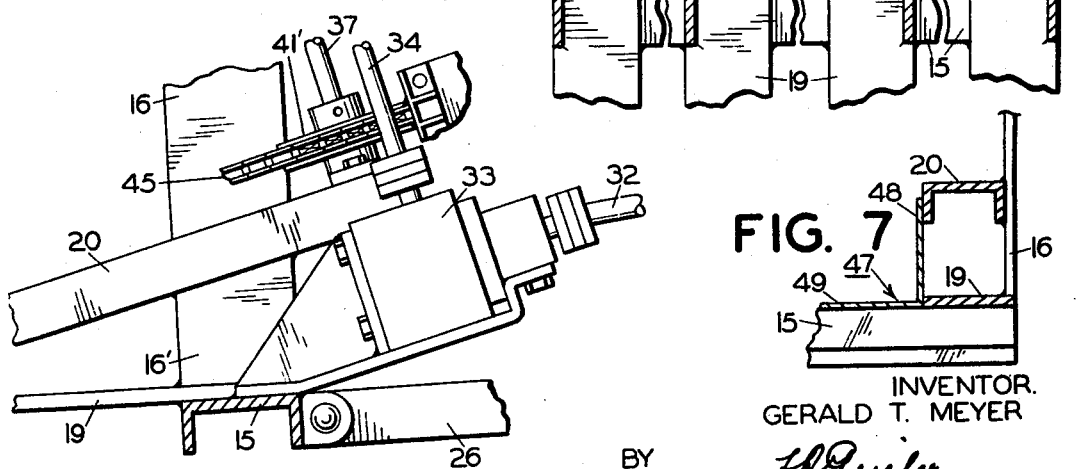
FIG. 8
FIG. 5
FIG. 7
INVENTOR.
GERALD T. MEYER
BY
ATTORNEY

United States Patent Office 3,393,501
Patented July 23, 1968

3,393,501
BRUSSELS SPROUTS HARVESTER
Gerald T. Meyer, Rte. 3, Box 950,
Boring, Oreg. 97009
Filed July 26, 1965, Ser. No. 474,810
5 Claims. (Cl. 56—327)

The present invention is concerned with the harvesting of brussels sprouts.

As is well known, the first step in the harvesting of brussels sprouts is to sever the main stalk of each plant close to the ground, whereupon the severed plant, consisting of the stalk with the sprouts attached thereto, is picked up and removed from the field for further processing for the market. The fact that it is necessary to sever each stalk, and that the cutting of the stalk must be done close to the ground, and that each plant must be picked up from the ground with reasonable care, present certain problems from the standpoint of the machine harvesting as well as from the standpoint of harvesting by manual labor.

The object of the present invention is to provide a novel and improved machine which will be adapted specifically for the harvesting of brussels sprouts.

A related object is to provide such a harvester which will cut through the stalks of the plants as close to the ground as desired and which will pick up each plant separately as the stalk is severed.

A further object is to provide a harvester of the type indicated, part of which will include an ordinary farm tractor but which will not necessitate any extensive reconstruction of the tractor portion itself.

An additional object of the invention is to provide a harvesting assembly in which that portion of the assembly which cuts the stalks of the plants and gathers the plants from the ground as they are cut, will be flexible and adjustable so as to be easily accommodated to different conditions.

The mean by which and the manner in which these objects and other advantages are attained with the present invention, and the main details of construction of this special harvester will be briefly described and explained with reference to the accompanying drawings, in which:

FIGURE 3 is a sectional side elevation taken on line 3—3 of FIGURE 2 and drawn to the same scale as FIGURE 2;

FIGURE 5 is a fragmentary sectional elevation on line 5—5 of FIGURE 2 drawn to a larger scale;

FIGURE 6 is a fragmentary section on line 6—6 of FIGURE 3 drawn to a still larger scale;

FIGURE 7 is a fragmentary sectional elevation on line 7—7 of FIGURE 1 drawn to the same scale as FIGURE 4; and FIGURE 8 is a fragmentary section on line 8—8 of FIGURE 3 drawn to a larger scale.

Figure 1:
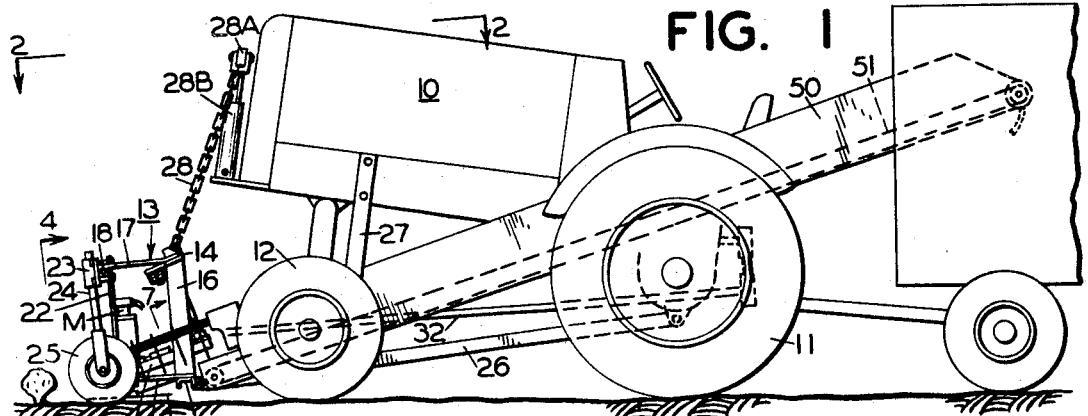
FIGURE 1 is a side elevation of the brussels sprouts harvester in operating position.

Referring first to FIGURE 1, the device includes a motor driven vehicle of the farm tractor type indicated in general by the reference character 10 having the usual pair of rear driving wheels 11 and front steering wheels 12.

Figure 4:
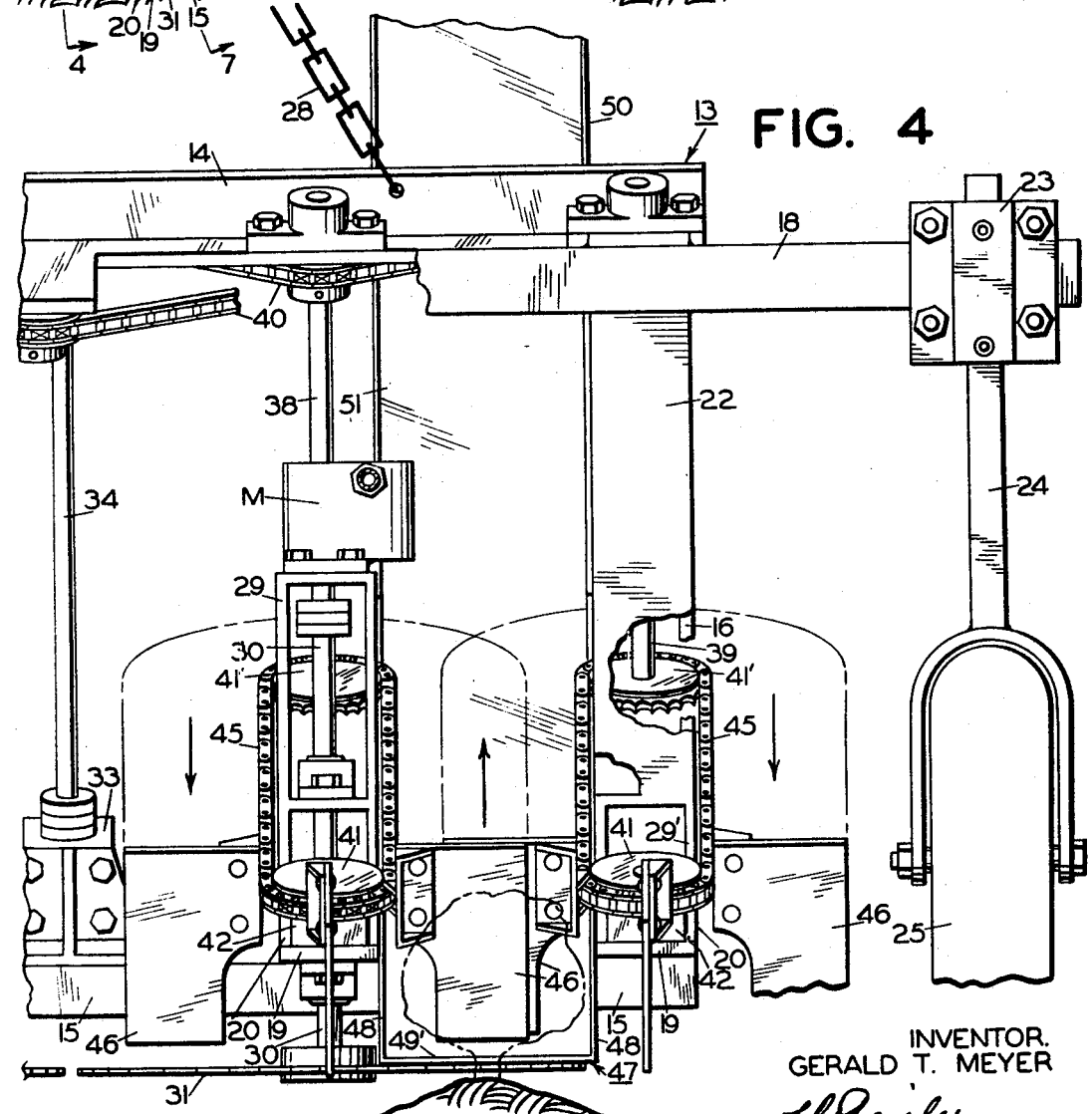
FIGURE 4 is a fragmentary front elevation taken on line 4—4 of FIGURE 1 and FIGURE 2, drawn to a larger scale.

A forward carriage assembly, indicated in general by the reference 13, is adjustably and flexibly mounted at the front of the tractor 10. Practically all of the harvesting elements are mounted in this forward carriage assembly. The carriage assembly includes a rigid frame composed of a top angle iron main cross member 14 and a main bottom cross member 15, preferably in the form of a channel iron. The bottom cross member 15 is rigidly connected with the top cross member 14 by a pair of upright side plates 16 at opposite sides of the carriage assembly (FIGURES 1, 3, 5, and 8). A pair of forwardly-tending top plates 17 (FIGURES 1, 2 and 3), rigidly secured to the top cross member 14, have a front top cross member 18 secured to their front ends. Four bottom members 19 (FIGURES 1, 3, 5 and 8), rigidly secured to the bottom cross member 15, extend forwardly. Four inclined inverted channel members 20 (FIGURES 1, 2, 3, 5, 6 and 7) are located above the members 19 respectively and their front ends converge with the front ends of the bottom members 19 respectively, being rigidly secured thereto. A side plate 16 (FIGURES 5 and 8) secures each of the two inner members 20 to the bottom cross members 15, and the two outer members 20 are secured to the side plates 16 respectively which have their bottom ends secured to the bottom cross member 15. A pair of upright front plates 22, one of which is shown in FIGURES 1 and 4, are also connected to the two outer members 20 by means of the inverted U-shaped members 29 and their top ends are connected with the pair of top forwardly-extending plates 17 respectively and with the front top cross member 18.

The front top cross member 18 (FIGURE 2) is extended at each side and a pair of clamp assemblies 23 are adjustably mounted on the end portions of this top cross member 18. Each of these clamp assemblies 23 holds the shank 24 of a forked mounting for a front ground wheel 25 on which the forward end of the carriage assembly is supported (see also FIGURE 4).

The bottom cross member 15 of the carriage assembly frame is hingedly connected to the forward ends of a pair of drive bars 26 (FIGURES 1, 2, 3, 5 and 8), the rear ends of which are hingedly mounted at the lower rear portion of the tractor 10 (FIGURE 1). The bars 26 are slidable up and down on the outer faces of a pair of stationary members 27 respectively (FIGURES 1, 2 and 3) which extend downwardly from the sides of the body of the tractor 10.

A pair of supporting chains 28 (FIGURES 1 and 2) have their lower ends secured to the top rear cross member 14 of the front carriage assembly 13 and have their upper ends connected to a cross head 28A carried on the top of a hydraulic piston rod which is part of a hydraulic cylinder and piston assembly 28B mounted at the front of the body of the tractor 10 (FIGURE 1). Thus the entire forward carriage assembly 13, with the lower rear portion of the carriage assembly hingedly connected to the push bars 26, which bars are free to move up and down to a limited extent, and with the rear top portion of the carriage assembly adjustably suspended from the front of the tractor 10 by the chains 28, and with the front portion of the carriage assembly supported on the adjustable ground wheels 25, is flexibly and adjustably mounted at the front of the tractor 10.

A pair of hydraulic motors M (FIGURES 2, 3 and 4) are each supported on an upright inverted U-shaped frame 29. The bottom ends of these U-shaped frames are welded to the top of the sides of the two inner inverted inclined forwardly-extending channel members 20 in the locations shown in FIGURE 2. Each of these hydraulic motors has its driven shaft 30 extending downwardly through suitable openings in the underlying members 20 and 19 and carries a circular saw 31 at the bottom of the driven shaft. Thus, as best shown in FIGURE 3, each of the circular saws 31 is positioned close to the ground beneath the front carriage assembly 13, the relative position of the saws 31 with respect to the ground being adjustable due to the adjustability of the entire front carriage assembly.

Figure 2:
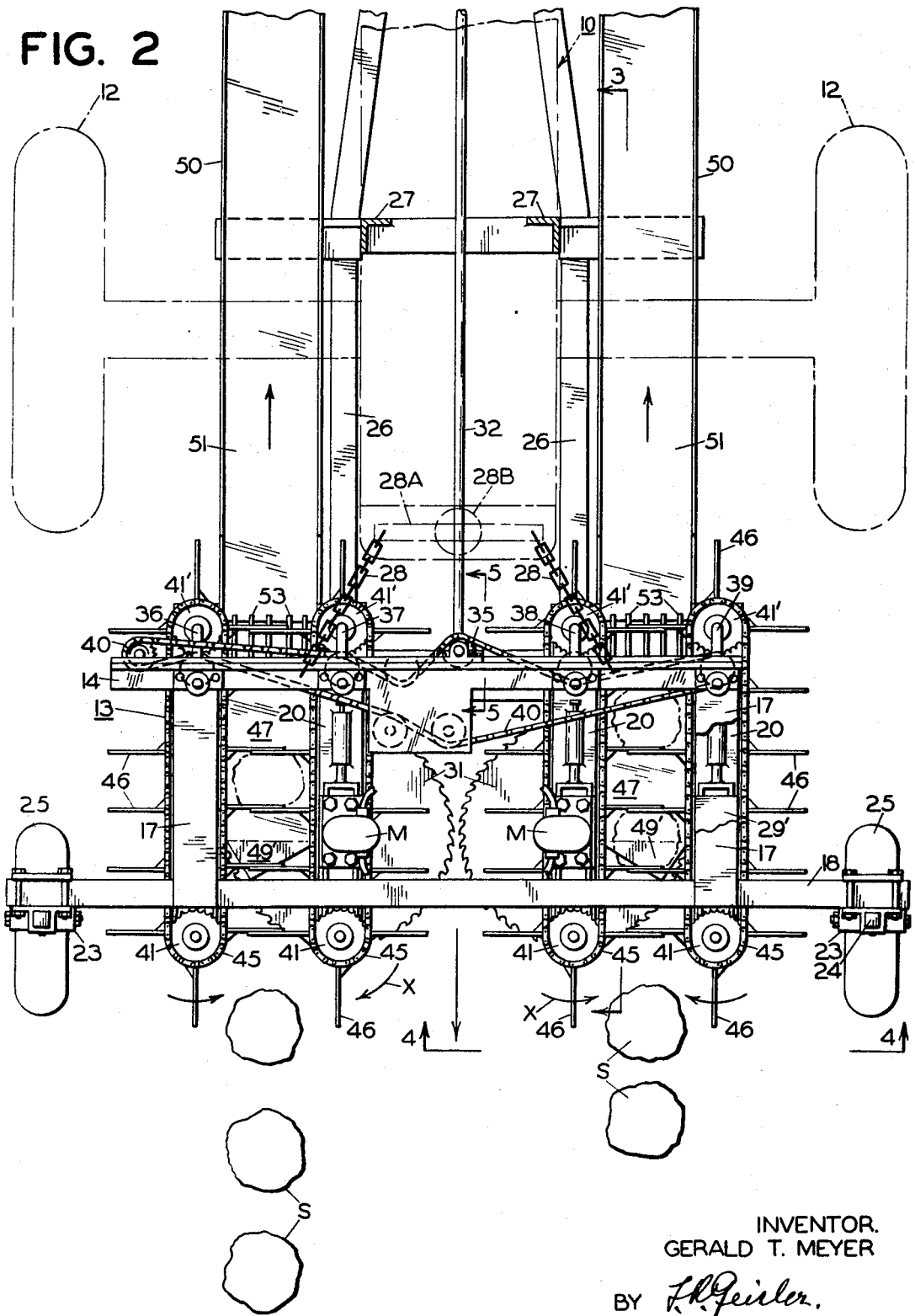
FIGURE 2 is a fragmentary top plan view drawn to a larger scale showing the front operating portion of the device and taken on the line 2—2 of FIGURE 1.

The two circular saws 31 are positioned in the same plane, are located close to each other, as shown in FIGURE 2, and are driven in opposite directions and thus in the directions indicated by the arrows X and X' in FIGURE 2. The motors M are connected up with the hydraulic system of the tractor 10 and are rotated at constant speed whenever the device is in operation.

A power take-off shaft 32 (FIGURES 1, 2, 3 and 5), driven from the tractor motor, extends forwardly and is connected through the intermediary of a universal joint to suitable gearing mounted in a gearing housing 33 (FIGURE 5) which is carried on the bottom cross member 15. A primary drive shaft 34 (see also FIGURE 3), extending up from the gearing housing 33 is driven from the power take-off shaft 32. This drive shaft 34 has a top bearing secured to the top cross member 14 and has a drive sprocket 35 secured near the top.

A rotating shaft extends upwardly from the rear of each of the four inclined inverted channel members 20, substantially perpendicular to the top surface of the member 20, being mounted at the bottom in a bearing suitably supported at the rear end of the member 20, and mounted at the top in a bearing supported from the top rear cross member 14. These four upwardly extending shafts are shown at 36, 37, 38 and 39 in FIGURE 2. Each of these four shafts carries an upper sprocket secured near the top of the shaft (and a lower sprocket, secured near the bottom of the shaft above the top face of the corresponding member 20. An endless sprocket chain 40 (FIGURES 2 and 4), driven by the top drive sprocket 35, engages the top sprocket on each of these shafts 36, 37, 38 and 39 thus casing rotation of these shafts. The sprocket chain 40 passes around idler guide sprockets, including a suitable chain-tensioning sprocket, all of which are arranged substantially as indicated in FIGURE 2 so as to cause rotation at uniform speed, but in pre-determined directions, of the shafts 36, 37, 38 and 39. Thus, referring to FIGURE 2, the shafts 36 and 38 are rotated in counter-clockwise direction (as viewed in FIGURE 2) and the other two shafts 37 and 39 are rotated in clockwise direction. The reason for this will be apparent later.

A sprocket wheel 41 (FIGURES 2, 4, 6), identical to the sprocket wheel mounted at the bottom of each of the shafts 36, 37, 38 and 39, is carried at the front end of each of the inclined members 20. The bearing for the shaft of each of these front sprocket wheels 41 is mounted in the end of a frame 42 (FIGURE 6) slidably carried on the top of the member 20. A stem 42', secured to the rear of the frame 42 is slidable in a guideway 43, and a coil spring is interposed between the end of the stem 42' and an adjustable plunger 44 in the guideway 43. An endless sprocket chain 45 (see also FIGURES 2, 4 and 5) extends around the lower rear sprocket wheel 41' on each of the shafts 36, 37, 38 and 39 and around the corresponding front sprocket wheel 41. The purpose of the adjustable mounting for each front sprocket wheel 41 just described, is to maintain the endless sprocket chains 45 sufficiently taut.

A plurality of identical, equally spaced blades 46 are carried on each of the chains 45. Preferably these blades are shaped as shown in FIGURE 4. The blades themselves are formed of semi-flexible resilient material, such as for example, as heavy rubber, but are attached to the chains 45 by means of suitable metal mounting brackets so that the blades will normally extend outwardly at right angles to the chains and thus radially outwardly from the end sprockets around which the chains pass, the blades nevertheless being flexible enough so that they will not damage the plants when coming into contact with the plants.

The four bottom forwardly-extending plates 19 and their corresponding members 20 which meet them at the forward ends, are spaced transversely as shown in FIGURE 2. Thus the spacing between the two inner sets of these members is approximately twice as great as the spacing between the inner and outer set at each side. Also positioning of these sets of members is so arranged that the intervening spaces between the inner and outer set at both sides will be approximately in line respectively with both rows in a pair of rows of the plants (indicated by S in FIGURE 2) with the rows spaced the customary planting distance apart in the field.

A guideway 47 (FIGURES 2, 3 and 4) is secured between the pairs of members 19 and 20 at each side. The two guideways 47 are each formed with a bottom wall and a pair of side walls, one such side wall being shown at 48 in FIGURE 3 and the bottom wall at 49. It will be noted in FIGURE 3 that the bottom wall extends forwardly beyond the side walls and that the front end 49' of the bottom wall extends at an angle with respect to the main portion of the bottom wall so as to be substantially parallel to the plane of the underlying saw, the front tip of the bottom wall being spaced only a slight distance above the saw.

A pair of upwardly and rearwardly sloping guideways 50 (FIGURES 1, 2 and 3) are mounted in stationary position on opposite sides of the tractor 10 by suitable means and are positioned in alignment with the pair of guideways 47 respectively of the front carriage assembly 13. An endless conveyor belt 51 extends along the bottom of each guideway 50. Each of the conveyor belts 51 passes around a drive roller at the upper discharging end of the guideway 50, the pair of drive rollers for these two conveyor belts 51 being driven by suitable hydraulic motors (not shown) operated from the hydraulic system of the tractor. The upper ends of the guideways 50 extend into a collecting wagon 52 (FIGURE 1) which is towed by the tractor 10.

A hinged grating 53 (FIGURES 2 and 3) is attached to the upper or discharging end of the bottom 49 of each guideway 47 leading from the front carriage assembly 13. These hinged gratings rest on the lower or receiving ends of the conveyor belts 51 in the guideways 50 of the tractor respectively, thus bridging the gap between each guideway 47 and the companion guideway 50, allowing for movement of the guideways 47 with respect to the guideways 50 and also allowing loose dirt, which might have been picked up with the severed plants, to drop down through the grating as the plant move from guideways 47 to guideway 50 on their travel to the collecting wagon 52.

In the operation of the harvester, the front carriage assembly 13 is adjusted so that the circular saws 31, and therewith the front ends 49' of the bottom walls of the guideways 47, will be approximately the desired distances above the ground. The saws are rotated at constant speed by their hydraulic motors regardless of the speed at which the harvester is driven over the ground. As the saws encounter the stalks of the plants (indicated by S in FIGURE 2) in the pair of rows being harvested, the cut plants are engaged by the cooperating pairs of blades 46 which move each severed plant immediately into and upwardly along the corresponding guideway 47. Since the blades are driven by means operated by the drive on the tractor 10 the speed of movement of the blades will be governed by the speed at which the tractor is driven over the ground. Furthermore, since the blades are formed of flexible semi-soft material, the likelihood of any plant being damaged as it is encountered by a converging pair of blades and as it is pushed along in a guideway 47 by the pair of blades as they assume overlapping position, is very remote. The spacing of the consecutive blades and the arrangement of the blades in the pairs of cooperating sets is such that there is no possibilty of crushing or squeezing the plants as they are gathered one by one immediately upon the severing of the stalk. The flexible connection of the front carriage assembly 13 with the tractor 10 also enables the harvester to accommodate itself to ordinary variations in the cultivated ground surface on which the harvesting takes place.

Minor modifications in the construction of the device will be possible within the scope of the invention and it is not intended to limit the invention otherwise than as set forth in the claims.

I claim:

1. A brussels sprouts harvester comprising a tractor, a forward carriage assembly connected with and driven by said tractor, a pair of adjustable ground wheels supporting said carriage assembly at the front, a pair of drive bars hingedly connected with said tractor and hingedly connected to the rear of said carriage assembly, adjustable means on said tractor supporting the rear portion of said carriage assembly, a pair of spaced rotating circular saws mounted in the same plane on but beneath the front portion of said carriage assembly, power means actuated from said tractor for rotating said saws, a pair of guideways leading rearwardly and upwardly on said carriage assembly from said saws respectively, two cooperating series of flexible plant-engaging blades carried on a pair of driven endless chains traveling along in each of said guideways from front to rear and entering into the front of each of said guideways from opposite directions, means operated by power take-off from said tractor for driving the endless chains for said blades in unison, a pair of guideways on said tractor leading upwardly and rearwardly from said guideways on said carriage assembly respectively, an endless conveyor moving along in the bottom of each of said latter mentioned guideways and discharging into a collecting receptacle at the rear of said tractor, and a hinged grating leading from each of said first mentioned guideways on said forward carriage assembly to said guideways on said tractor respectively.

2. A brussels sprouts harvester including a farm tractor, a forward carriage assembly connected with and driven by said tractor, a pair of ground wheels supporting said carriage assembly at the front, flexible means connecting the rear of said carriage assembly with said tractor, a pair of spaced rotating circular saws mounted in the same plane at the front portion of said carriage assembly, power means for rotating said saws, a pair of guideways leading rearwardly on said carriage assembly from said saws respectively, a series of plant-engaging blades carried on a driven chain traveling along in each of said guideways from front to rear, means operated from said tractor for driving the endless chains for said blades, a pair of guideways on said tractor leading rearwardly from said guideways on said carriage assembly respectively, and an endless conveyor moving along in the bottom of each of said latter mentioned guideways.

3. In a harvester of the character described, a tractor vehicle, a forward carriage assembly connected with and driven by said tractor vehicle, a pair of ground wheels supporting said carriage assembly at the front, a pair of drive bars hingedly connected with said tractor and hingedly connected to the rear of said carriage assembly, means on said tractor for supporting the rear portion of said carirage assembly, a rotating circular saw mounted on but beneath the front portion of said carriage assembly, power means for rotating said saw, a guideway leading rearwardly on said carriage assembly from said saw, a series of plant-engaging blades carried on a driven endless chain traveling along said guideway from front to rear, means operated from said tractor for driving the endless chain for said blades, a guideway on said tractor leading rearwardly from said guideway on said carriage assembly, and an endless conveyor moving along in the bottom of said latter mentioned guideway.

4. In a harvester of the character described, a tractor vehicle, a forward carriage assembly connected with and driven by said tractor vehicle, a pair of ground wheels supporting said carriage assembly in the front, flexible means connecting the rear of said carriage assembly with said tractor vehicle, a rotating circular saw mounted on but beneath the front portion of said carriage assembly, power means for rotating said saw, a guideway leading rearwardly on said carriage assembly from said saw, two cooperating series of plant-engaging blades carried on a pair of driven endless chains traveling along in said guideway from front to rear and entering into the front of said guideway from opposite directions, means operated by power takeoff from said tractor vehicle for driving the endless chains for said blades in unison, and a guideway on said tractor leading rearwardly from said guideway on said carriage assembly.

5. In a brussels sprouts harvester, a tractor vehicle, a forwardly extending carriage assembly connected with the front of said tractor vehicle, a pair of adjustable ground wheels on said carriage assembly, a pair of spaced rotating circular saws suspended from said carriage assembly and located close to the ground, the axes of said saws being in transverse alignment, motor means on said carriage assembly for rotating said saws, a pair of guideways on said carriage assembly with one leading rearwardly and upwardly from the central portion of each of said saws respectively, and means associated with each of said guideways for engaging the plants cut by said saws and moving the cut plants along said guideways.

References Cited

UNITED STATES PATENTS

| | | | |
|---|---|---|---|
| 1,174,762 | 3/1916 | Quance | 56—157 |
| 1,231,837 | 7/1917 | Arndt | 56—157 |
| 1,669,917 | 5/1928 | Stone | 56—157 |
| 2,522,308 | 9/1950 | Silva | 56—327 |
| 2,588,764 | 3/1952 | Richmond | 56—327 |
| 3,178,873 | 4/1965 | Meyer | 56—27.5 |

RUSSELL R. KINSEY, *Primary Examiner.*